(12) United States Patent
Liljegren

(10) Patent No.: US 9,297,359 B1
(45) Date of Patent: Mar. 29, 2016

(54) PITCH CONTROL ASSEMBLY FOR VERTICAL AXIS WIND TURBINE

(71) Applicant: Dennis Alan Liljegren, Houston, TX (US)

(72) Inventor: Dennis Alan Liljegren, Houston, TX (US)

(*) Notice: Subject to any disclaimer, the term of this patent is extended or adjusted under 35 U.S.C. 154(b) by 669 days.

(21) Appl. No.: 13/739,335

(22) Filed: Jan. 11, 2013

Related U.S. Application Data

(60) Provisional application No. 61/588,364, filed on Jan. 19, 2012.

(51) Int. Cl.
*F03D 3/06* (2006.01)
*F03D 3/00* (2006.01)

(52) U.S. Cl.
CPC ............... *F03D 3/068* (2013.01); *F03D 3/005* (2013.01); *F05B 2240/211* (2013.01); *F05B 2260/72* (2013.01)

(58) Field of Classification Search
CPC ......... F03D 3/067; F03D 3/068; F03D 3/005; F03D 3/06; F03D 3/062; F03D 7/06; F05B 2240/212; F05B 2240/214; F05B 2260/72; F05B 2260/74; F05B 2240/211; F05B 2240/216
See application file for complete search history.

(56) References Cited

U.S. PATENT DOCUMENTS

| | | | | |
|---|---|---|---|---|
| 1,846,162 A * | 2/1932 | Thomas | ................ | F03B 17/065 416/52 |
| 4,087,202 A * | 5/1978 | Musgrove | ............... | F03D 3/061 416/117 |
| 4,105,363 A * | 8/1978 | Loth | ....................... | F03D 3/061 416/111 |
| 4,130,380 A * | 12/1978 | Kaiser | ..................... | F03D 3/065 416/132 B |
| 4,274,809 A * | 6/1981 | Delgado | .................... | F03D 7/06 416/117 |
| 4,299,537 A * | 11/1981 | Evans | ..................... | F03D 3/068 416/108 |
| 5,299,913 A * | 4/1994 | Heidelberg | ............ | F03D 3/005 290/55 |
| 7,118,341 B2 * | 10/2006 | Hartman | ................... | F03D 3/00 415/4.2 |
| 7,677,862 B2 * | 3/2010 | Boatner | ................. | F03D 3/068 415/4.2 |
| 2003/0049128 A1 * | 3/2003 | Rogan | ....................... | F03D 3/02 416/131 |

FOREIGN PATENT DOCUMENTS

| | | | | |
|---|---|---|---|---|
| DE | 3026315 A1 * | 2/1982 | ............. | F03D 3/005 |
| DE | 19835958 A1 * | 2/2000 | ............. | F03D 3/061 |
| GB | 2008202 A * | 5/1979 | ............. | F03D 3/068 |

OTHER PUBLICATIONS

Machine translation of DE 19835958 A1 (Feb. 2000) from Espacenet.*

* cited by examiner

*Primary Examiner* — Igor Kershteyn
*Assistant Examiner* — Christopher R Legendre
(74) *Attorney, Agent, or Firm* — Plager Schack LLP

(57) ABSTRACT

A pitch control assembly for a vertical axis wind turbine provides greater efficiency to the vertical axis wind turbine. The pitch control assembly comprises a pitch control assembly housing mechanically coupled to a first stop bar, a second stop bar and a cushion mass. The pitch control assembly housing is mechanically coupled to a pitch control assembly bottom plate where the pitch control assembly bottom plate is mechanically coupled to a dampening spring. The dampening spring is mechanically coupled to a blade control plate, where the blade control plate is mechanically coupled to a first blade control pusher bar, a second blade control pusher bar and a blade control plate stem. A heavier mass and a lighter mass rest upon the blade control plate; the blade control plate stem is mechanically coupled to a vertical axis, which is used in the vertical axis wind turbine.

6 Claims, 5 Drawing Sheets

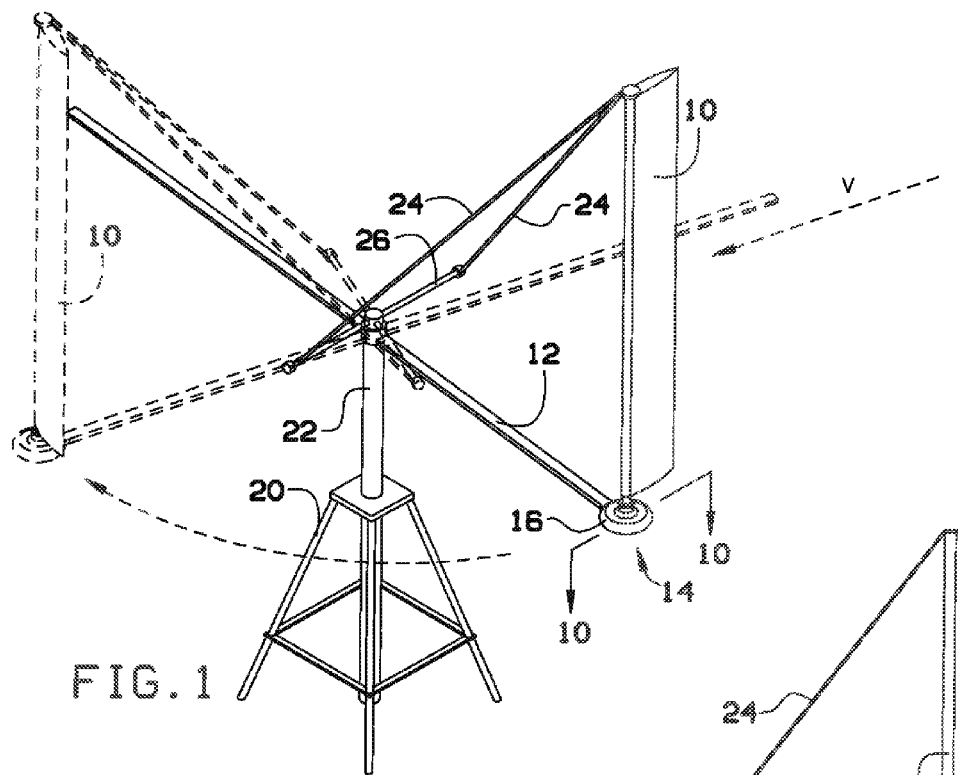
FIG. 1
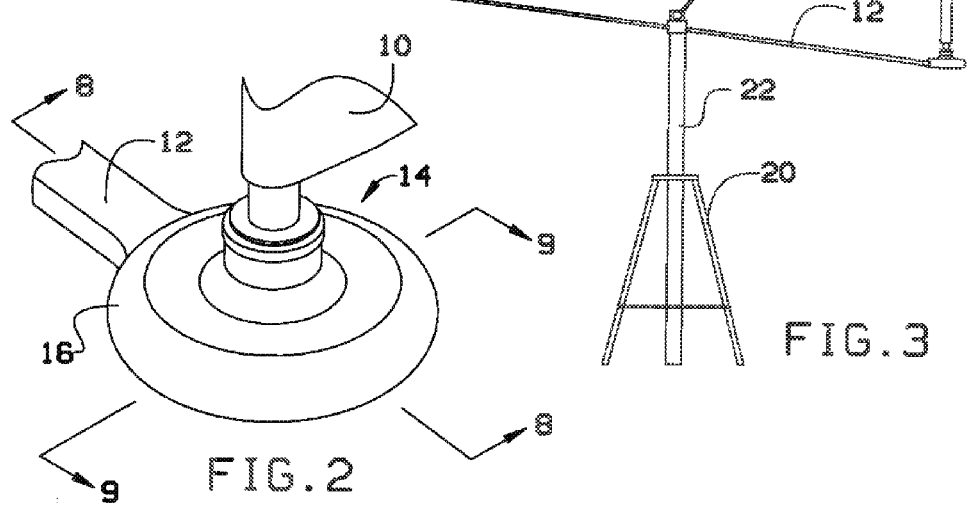
FIG. 2
FIG. 3

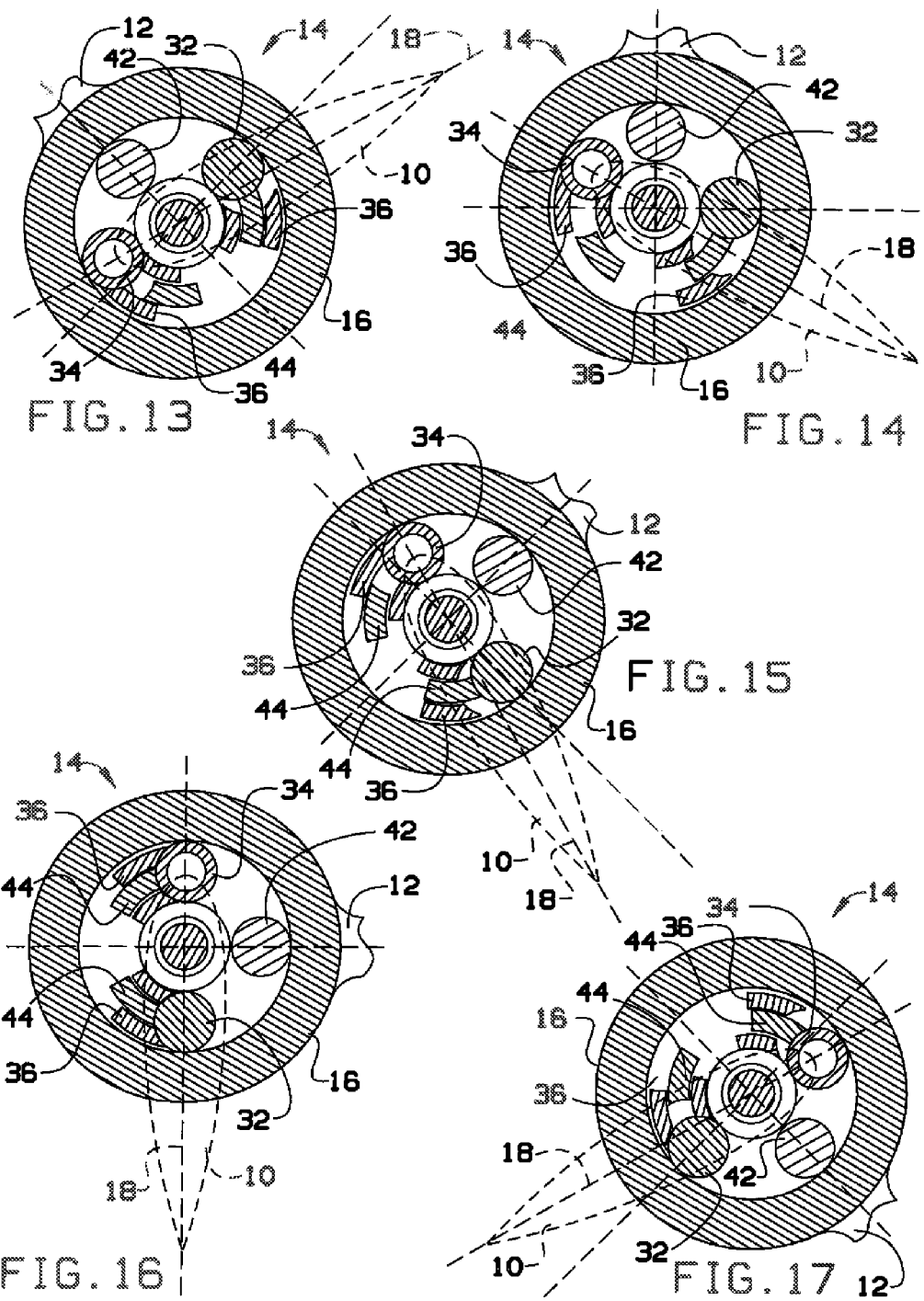

PITCH CONTROL ASSEMBLY FOR VERTICAL AXIS WIND TURBINE

CROSS REFERENCE TO RELATED APPLICATIONS

This application claims priority to U.S. Provisional Application 61/588,364 filed on Jan. 19, 2011.

FIELD OF THE INVENTION

This invention relates to devices that can convert wind to power for electricity, pumping, compression of gases, etc.

BACKGROUND OF THE INVENTION

The vertical axis wind turbine is well known. See U.S. Pat. No. 4,430,044 issued to Liljegren (the '044 patent). The '044 patent provided revolutionary insight into the development of wind turbines that were able to start with extremely low wind velocities compared to other wind turbines. The present invention offers an improvement to the '044 patent with a novel pitch control assembly.

BRIEF SUMMARY OF THE INVENTION

A vertical axis wind turbine can efficiently transform a wind current to mechanical energy. The vertical axis wind turbine comprises a vertical axis that is attached to a rotor arm and a cross bar. The cross bar is mechanically coupled to an air foil blade by a first support line and a second support line. The air foil blade is further mechanically coupled to a pitch control assembly. The pitch control assembly is mechanically coupled to the rotor arm, and the rotor arm is mechanically coupled to the vertical axis. In this manner, the wind current can accelerate the air foil blade around the vertical axis, turning the vertical axis and creating mechanical energy.

A pitch control assembly for vertical axis wind turbine provides greater efficiency to the vertical axis wind turbine. The pitch control assembly comprises a pitch control assembly housing mechanically coupled to a first stop bar, a second stop bar and a cushion mass. The pitch control assembly housing is mechanically coupled to a pitch control assembly bottom plate where the pitch control assembly bottom plate is mechanically coupled to a dampening spring. The dampening spring is mechanically coupled to a blade control plate, where the blade control plate is mechanically coupled to a first blade control pusher bar, a second blade control pusher bar and a blade control plate stem. A heavier mass and a lighter mass rest upon the blade control plate. The blade control plate stem is mechanically coupled to a vertical axis which is used in the vertical axis wind turbine. In this manner, the heavier mass and the lighter mass allow an air foil blade to rotate in either direction which converts wind energy into rotational energy that accelerates the air foil blade and increase rotation of a rotor arm affixed to the pitch control assembly housing and the air foil blade until linear velocity of the air foil blade exceeds a given velocity where the heavier mass pushes against the first blade control pusher bar and the lighter mass pushes against the second blade control pusher bar locking the air foil blade in a position tangent to the rotor arm.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 1 is a perspective view of the invention of the invention shown in use.

FIG. 2 is a detail perspective view of the invention.

FIG. 3 is a side view of the invention.

Figure 4:
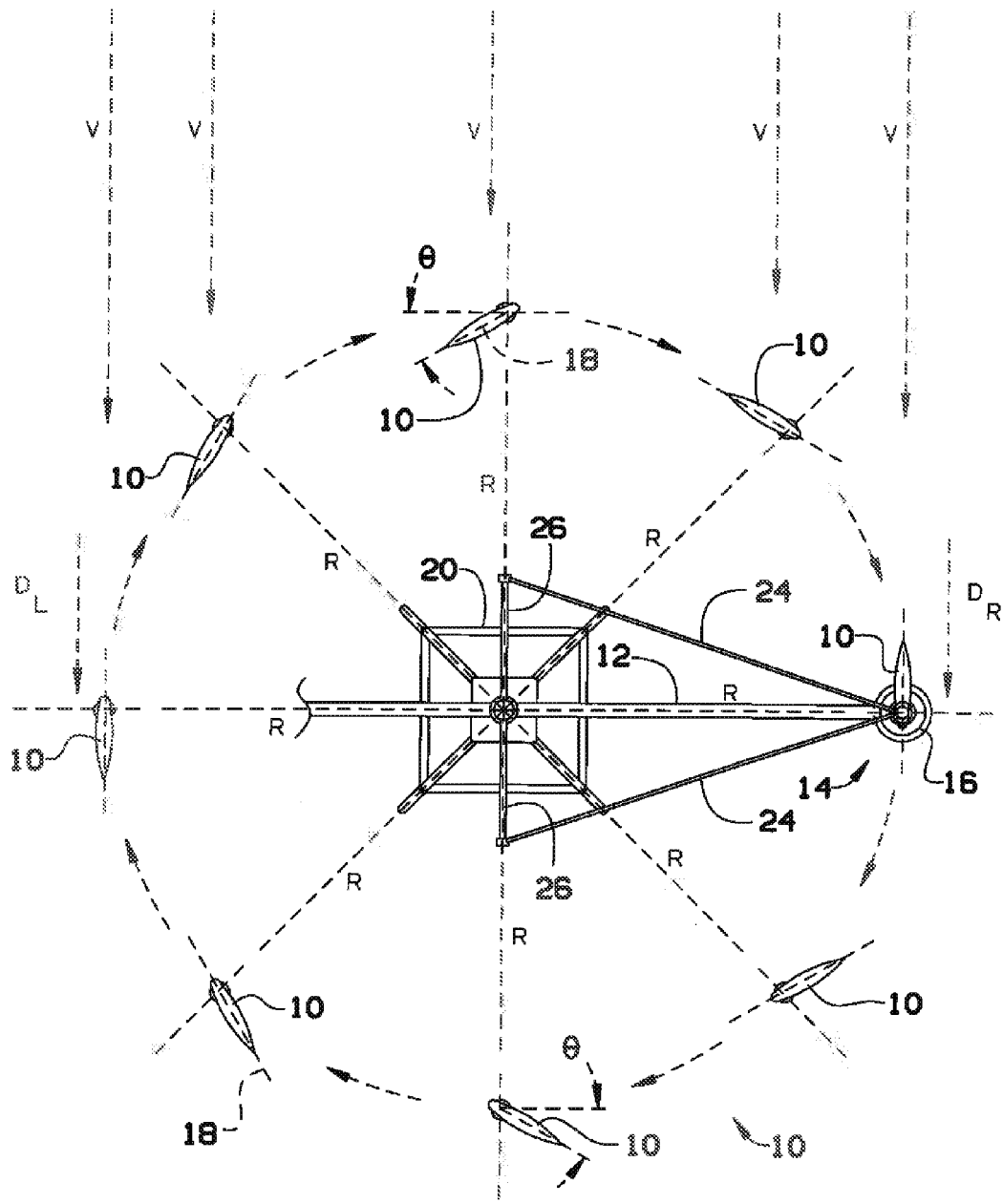

FIG. 4 is a top view of the invention shown in use which illustrates the various exemplary blade positions at 45 degree increments.

Figure 5:
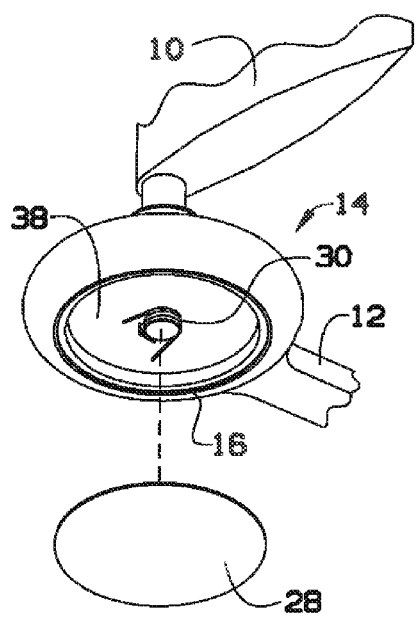

FIG. 5 is a bottom perspective partial exploded view of the invention.

Figure 6:
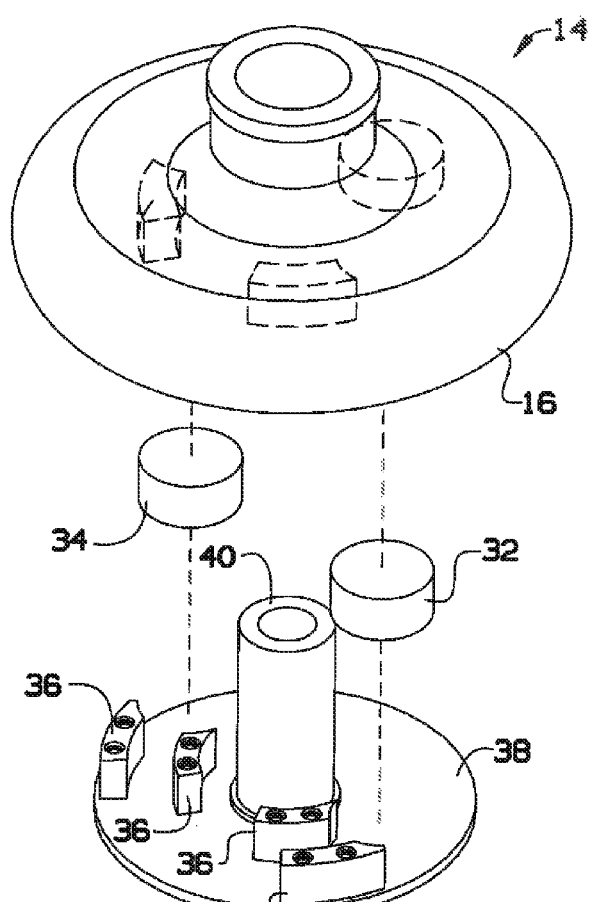

FIG. 6 is an exploded view of the invention item 14 pitch control assembly.

Figure 7:
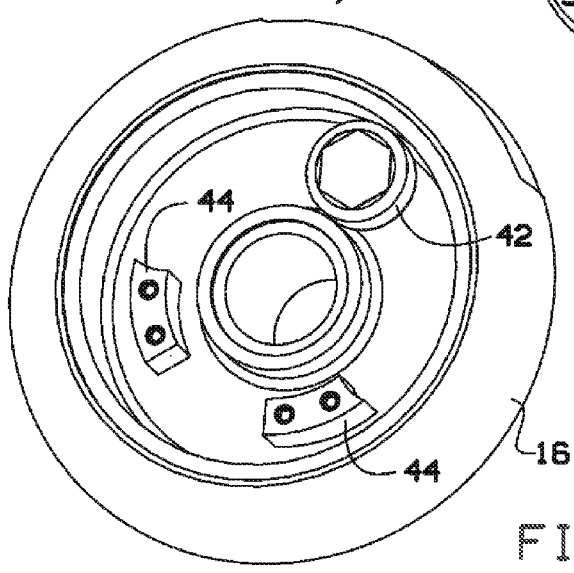

FIG. 7 is a bottom perspective view of the invention item 16 pitch control assembly housing.

Figure 8:
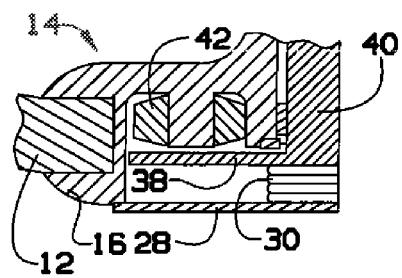

FIG. 8 is a detail section view of the invention along line 8-8 in FIG. 2.

Figure 9:
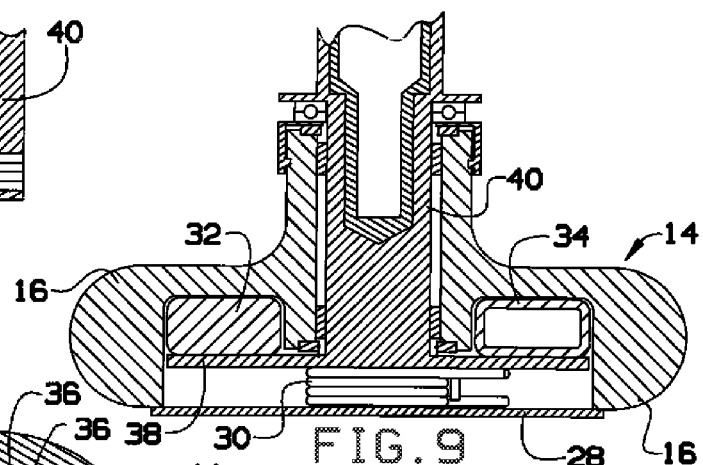

FIG. 9 is a detail section view of the invention along line 9-9 in FIG. 2.

Figure 10:
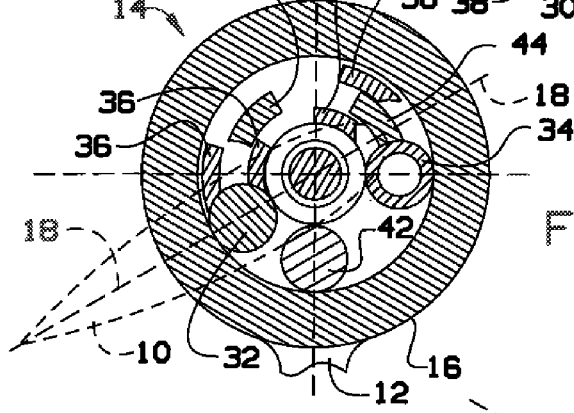

FIG. 10 is a detail section view of the invention along line 10-10 in FIG. 1 shown at the 0 degree position in FIG. 4.

Figure 11:
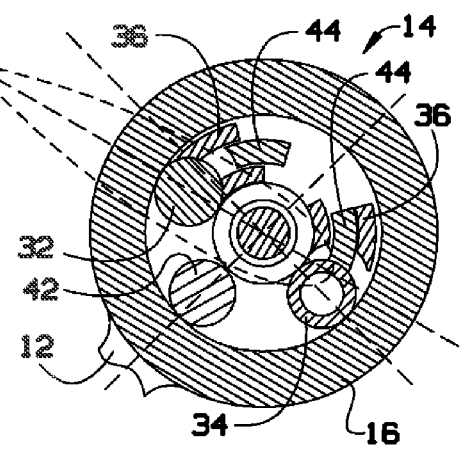

FIG. 11 is a detail section view of the invention shown at the 45 degree position in FIG. 4.

Figure 12:
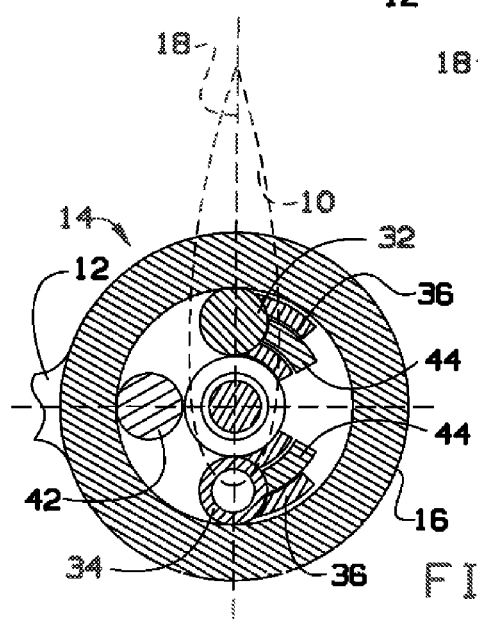

FIG. 12 is a detail section view of the invention shown at the 90 degree position in FIG. 4.

FIG. 13 is a detail section view of the invention shown at the 135 degree position in FIG. 4.

FIG. 14 is a detail section view of the invention shown at the 180 degree position in FIG. 4.

FIG. 15 is a detail section view of the invention shown at the 225 degree position in FIG. 4.

FIG. 16 is a detail section view of the invention shown at the 270 degree position in FIG. 4.

FIG. 17 is a detail section view of the invention shown at the 315 degree position in FIG. 4.

DETAILED DESCRIPTION OF THE INVENTION

Embodiments of the present invention overcome many of the obstacles associated with efficiently operating a vertical wind turbine, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 and FIG. 3 show the invention in use. The vertical axis wind turbine is shown comprising base 20 mechanically coupled to vertical axis 22. Vertical axis 22 is attached to rotor arm 12 and cross bar 26. Cross bar 26 is mechanically coupled to air foil blade 10 by a first support line 24 and a second support line 24. Rotor arm 12 is mechanically coupled to pitch control assembly housing 16 of pitch control assembly 14 as shown in more detail in FIG. 2. Pitch control assembly 14 is further mechanically coupled to air foil blade 10 as shown in more detail in FIG. 5.

This demonstrates the first advantage over the '044 patent. The '044 patent utilized two air foils blades 10, which caused a problem with the turbulence of a first air foil blade 10 interfering with wind current V on a second air foil blade 10. The '044 patent utilized the second air foil blade 10 to balance the first air foil blade 10. The present invention solves this problem by tethering air foil blade 10 to cross bar 26 with first support line 24 and second support line 24. In the preferred embodiment, experimentation has indicated that when rotor arm 12 is inclined at least four degrees from parallel to the ground in order to minimize the rotating couple effect on the airfoil and provide the most efficient path for air foil blade 10 to travel.

FIG. 2, FIG. 8 and FIG. 9 show the relationship between rotor arm 12 and airfoil 10 in more detail. Rotor arm 12 is mechanically coupled to pitch control assembly housing 16. Pitch control assembly housing is mechanically coupled to pitch control assembly bottom plate 28. Pitch control assembly bottom plate is mechanically coupled to dampening spring 30 used to soften the tacking of the air foil blade 10 at maximum pivot position in either direction, which is further mechanically coupled to blade control plate 38. Blade control plate 38 is mechanically coupled to blade control plate stem 40.

FIG. 5, FIG. 6 and FIG. 7 show pitch control assembly 14 in more detail. Pitch control assembly housing 16 is mechanically coupled to first stop bar 44, second stop bar 44 and mass cushion 42. Note that in the preferred embodiment, first stop bar 44 and second stop bar 44 have rounded edges in order to accommodate heavier mass 32 and lighter mass 34. Blade control point 38 is mechanically coupled to first blade control pusher bar 36, second blade control pusher bar 36, third blade control pusher bar 36, fourth first blade control pusher bar 36, and blade control plate stem 40. For clarity, first blade control pusher bar 36 and second blade control pusher bar 36 are proximate heavier mass 32 while third blade control pusher bar 36 and fourth first blade control pusher bar 36 are proximate lighter mass 34. While only two blade control pusher bars 36 are necessary, the additional two blade control pusher bars 36 provide greater control of the masses. Mass cushion 42 is approximately equidistant first stop bar 44 and second stop bar 44. For clarity, first stop bar 44 is proximate heavier mass 32 while second stop bar 44 is proximate lighter mass 32. The relationship between these components is explained in more detail in FIG. 10, FIG. 11, FIG. 12, FIG. 13, FIG. 14, FIG. 15, FIG. 16 and FIG. 17.

FIG. 4 is a top view of the invention shown in use which illustrates the various exemplary blade positions at 45 degree increments and is substantially similar to FIG. 10 and FIG. 11 in the '044 patent. Briefly paraphrasing that discussion: Air foil blade 10 will effectively oscillate between equal but opposite pivotal positions, inwardly and outwardly of a tangent of its orbit as it progresses through a full revolution. Due to the pivotal capability of air foil blade 10, a component of force in the direction of rotation of the vertical axis wind turbine is generated by the blade form in every position throughout its orbit, except when it is moving head-on into the wind (FIG. 12 and FIG. 16). Therefore, for any position in which rotor 12 may stop, a force adequate to initiate rotation can be generated by a wind flow and the flywheel effect of mass in rotation. At low rotational speed, a positive force is generated by air foil blade 10 in a direction to accelerate rotation of the vertical axis wind turbine 10 throughout the orbital path, thereby providing high torque to the driven shaft and a substantial increase in low speed efficiency.

Once the vertical axis turbine 10 begins rotation, as rotor 12 accelerates, the increasing tangential velocity of air foil blade 10 has effect on the direction and velocity of the wind flow which the blade form 40 realizes. A relative wind current R is the approximate resultant of the wind current V and the tip speed of the rotor 12 (which is the same as the tangential velocity of air foil blade 10). A change in either the wind flow V or the tip speed results in a change in magnitude and direction of the relative wind current R.

Generally, until the tip speed equals the wind current V, as the tip speed of the rotor increases the relative wind current R increases on the upstream side of the vertical axis wind turbine and decreases on the downstream side of the vertical axis wind turbine. At low turbine speeds, air foil blade 10 adapts to changes in the magnitude and direction of the relative current R by obtaining a pivotal position of balance between the forces of the wind R, thereby obtaining a favorable pitch angle θ with the relative wind R to generate maximum rotational force for its relative position in orbit.

Pitch control assembly 14 allows air foil blade 10 to rotate about a vertical axis 30 degrees horizontally to capture wind energy and begin the rotation of air foil blade 10 and pitch control assembly 14 around rotor arm 12. Pitch control assembly 14 allows air foil blade to tack like a sail on a sailboat in the upwind and downwind direction. This keeps air foil blade 10 rotating and gaining speed with each revolution. As rotational speed increases, air foil blade 10 creates more lift, greater air foil blade linear velocity, and produces more energy.

After several rotations at any given wind speed above a given velocity such as 6 mph, rotor arm 12 rotational energy increase the centrifugal force and increase the mass moment force on heavier mass 32 and lighter mass 34. This causes heavier mass 32 and lighter mass 34 to push against aerodynamic moment by means of exerting force against the pusher bars 36 causing air foil blade 10 to begin to change relative angle θ depending on force by heavier mass 32 and lighter mass 34 on the pusher bars 36 with more force as rotor arm 12 continues to accelerate and begin to progressively restrict the angle of attack of air foil blade 10.

As air foil blade 10 accelerates, centrifugal force creates a larger mass moment on heavier mass 32 and lighter mass 34, which in turn causes more force on pusher bars 36. When the linear velocity of air foil blade 10 reaches 4 to 4.5 times the relative velocity of the wind, the mass moment between heavier mass 32 and lighter mass 34 will overcome the aerodynamic moment of the air foil blade and push against a stop bar 44 to lock air foil blade 10 into a position tangent to the orbit of rotor arm 12. This is the point of maximum lift throughout the air foil blade's revolution. This point causes the most efficient capture of available power from the wind at any wind speed and maximizes the torque transmitted to the vertical drive shaft. The illustrations in FIG. 4 show the pivotal displacement of the blades affected by wind current V flowing, as shown, from top to bottom of the page. In this manner, the different weights of heavier mass 32 and lighter mass 34 teach away from the "equal mass" teaching in the '044 patent. The upwind mass and downwind mass must be different rendering the device more efficient. Further stop bars 44 and push bars 36 maneuver the heavier mass 32 and lighter mass 34 in a more efficient manner than the '044 patent.

In a 90 degree orbital position (FIG. 12), air foil blade 10 is positioned parallel to and directed into wind current V. Since each side of air foil blade 10 is exposed equally to the wind current V, air foil blade 10 will maintain a tangential position momentarily at this point in its rotation. A slight drag force $D_R$ acts on air foil blade 10 opposing rotation of rotor arm 12 by the wind flowing head-on against air foil blade 10. The aerodynamic shape of air foil blade 10 minimizes the drag force acting on the blade in this position. Turning to FIG. 12, mass cushion 42 is approximately equidistant heavier mass 32 and lighter mass 34. First stop bar 44, first blade control pusher bar 36 and second blade control pusher bar 36 are all immediately adjacent to heavier mass 32. Likewise, second stop bar 44, third blade control pusher bar 36 and fourth blade control pusher bar 36 are all immediately adjacent to lighter mass 32. At this moment, the components are stationary until the wind starts to move air foil blade 10, tacking it clockwise into the 135° degree position of its orbit as shown in FIG. 13.

Where air foil blade 10 is in a 45° position of its orbit, the wind current V exerts a force against the outer side of air foil blade 10 to pivotally displace air foil blade 10 through an angle, directed outwardly of its tangent position. The angle is determined by a balance of relative wind R acting on air foil blade 10, as described above. In this pivotal position, air foil blade 10 obtains a pitch angle with the wind current V to generate a lift force, having a relative wind R in the direction of rotation of rotor 12, to initiate rotation of and accelerate the vertical axis wind turbine. Turning to FIG. 13, as air foil blade 10 rotates third blade control pusher bar 36 and fourth blade control pusher bar 36 move lighter mass 34 ultimate second stop bar 44 and proximate cushion mass 42. Meanwhile, heavier mass 32 remains in place as first blade control pusher bar 36 and second blade control pusher bar 36 moves ultimate heavier mass 32.

In FIG. 14, air foil blade 10 is in a 180° position of its orbit, the outer side of air foil blade 10 is exposed perpendicularly to wind current V when air foil blade 10 is in a tangential position with its orbit. In this position, the wind flow exerts a large force against air foil blade 10 pivotally displacing air foil blade 10 to an angle θ. The angle θ is generally a maximum pivotal position for air foil blade 10. In this position, air foil blade 10 obtains a favorable pitch angle with the wind current V to generate a large lift force having a component in the direction of rotation of the rotor 12. As air foil blade 10 rotates third blade control pusher bar 36 and fourth blade control pusher bar 36 continue to move lighter mass 34 ultimate second stop bar 44 and proximate cushion mass 42. Meanwhile, heavier mass 32 continues to remain in place as first blade control pusher bar 36 and second blade control pusher bar 36 continue to move ultimate heavier mass 32.

In FIG. 15, air foil blade 10 is in a 225° position of its orbit is also maximally pivoted. In this pivoted position, air foil blade 10 has substantially exposed its outer surface perpendicularly to the wind flow. Air foil blade 10 will thus generate a drag force parallel to the wind flow and a lift force component, to provide resultant force R, having a component in the direction of rotation of rotor 12. As air foil blade 10 adjusts its position third blade control pusher bar 36 and fourth blade control pusher bar 36 continue to move lighter mass 34 ultimate second stop bar 44 and proximate cushion mass 42. Meanwhile, heavier mass 32 continues to remain in place as first blade control pusher bar 36 and second blade control pusher bar 36 continue to move ultimate heavier mass 32.

In FIG. 16, in the 270° orbital positions air foil blade 10 parallel with the wind current V and directed away from the wind. Since air foil blade 10 is directed head-on into the wind flow, the wind force component exerted against its two sides is equal and the wind does not tend to pivot air foil blade 10. Air foil blade 10 in this position will produce drag force component $D_L$. The drag force component generated by air foil blade 10 in this position is larger than the drag force component acting against rotation of the turbine on air foil blade 10 in the zero degree position, thereby providing a resultant force in a direction to accelerate rotation of the turbine.

In FIG. 17, in a 315° position of the orbit exposes an inner side of the blade to the wind current V. The force of wind current V on the inner side of air foil blade 10 maximally displaces the blade an angle inwardly of its tangential position, the angle equals the angle on the opposite side of the tangent of the orbit. Here, air foil blade 10 is angularly displaced a maximum amount and substantially exposes its inner side perpendicularly with wind current V. In this position the blade produces a drag force parallel to wind current V and a lift force component, having a resultant force with a component in the direction of rotation of rotor arm 12. As air foil blade 10 rotates first blade control pusher bar 36 and second blade control pusher bar 36 move heavier mass 32 ultimate first stop bar 44 and proximate cushion mass 42. Meanwhile, lighter mass 34 remains in place as third blade control pusher bar 36 and fourth blade control pusher bar 36 moves ultimate heavier mass 32.

In FIG. 10, In a 0° position of its orbit, air foil blade 10 maintains a maximally pivoted position through angle θ. Air foil blade 10 has obtained a favorable pitch angle with the wind current V to generate a large lift force in a direction to accelerate rotation of the turbine. Absent the pivotal movement of air foil blade 10 in this position, its surface would be positioned normal to the wind current W unable to produce any lift force, as is also true for air foil blade 10 in a 180° orbital position. As air foil blade 10 rotates first blade control pusher bar 36 and second blade control pusher bar 36 continue to move heavier mass 32 ultimate first stop bar 44 and proximate cushion mass 42. Meanwhile, lighter mass 34 continues to remain in place as third blade control pusher bar 36 and fourth blade control pusher bar 36 continue to move ultimate lighter mass 34.

In FIG. 11, a 45° orbital position, air foil blade 10 is pivotally displaced an angle, which is determined by a balance of forces of the wind acting on air foil blade 10. In this position, air foil blade 10 assumes a favorable pitch angle with the wind current to produce a lift force, having a component in a direction to accelerate rotation of the vertical axis wind turbine. The angle is generally less than the maximum pivotal displacement of which air foil blade 10 is capable.

That which is claimed:

1. A pitch control assembly for a vertical axis wind turbine that provides greater efficiency to the vertical axis wind turbine, the pitch control assembly comprising,
   a pitch control assembly housing mechanically coupled to a first stop bar, a second stop bar and a cushion mass; the pitch control assembly housing is mechanically coupled to a pitch control assembly bottom plate where the pitch control assembly bottom plate is mechanically coupled to a dampening spring;
   the dampening spring is mechanically coupled to a blade control plate, where the blade control plate is mechanically coupled to a first blade control pusher bar, a second blade control pusher bar and a blade control plate stem;
   a heavier mass and a lighter mass rest upon the blade control plate; the blade control plate stem is mechanically coupled to a vertical axis which is used in the vertical axis wind turbine;
   in this manner, the heavier mass and the lighter mass allow an air foil blade to rotate in either direction which converts wind energy into rotational energy that accelerates the air foil blade and increases rotation of a rotor arm affixed to the pitch control assembly housing and the air foil blade until linear velocity of the air foil blade exceeds a given velocity where the heavier mass pushes against the first blade control pusher bar and the lighter mass pushes against the second blade control pusher bar locking the air foil blade in a position tangent to the rotor arm.

2. The pitch control assembly of claim 1, further comprising,
   the blade control plate is further mechanically coupled to a third blade control pusher bar and a fourth blade control pusher bar to allow greater control of the heavier mass and the lighter mass.

3. The pitch control assembly of claim 1, further comprising,
   the blade control plate is further mechanically coupled to a third blade control pusher bar and a fourth blade control pusher bar;
   where the first blade control pusher bar, the second blade control pusher bar, the third blade control pusher bar, and the fourth blade control pusher bar have rounded ends to allow greater control of the heavier mass and the lighter mass.

4. A vertical axis wind turbine that can efficiently transform a wind current to mechanical energy, the vertical axis wind turbine comprising,
   a vertical axis that is attached to a rotor arm and a cross bar; the cross bar is mechanically coupled to an air foil blade by a first support line and a second support line; the air foil blade is further mechanically coupled to a pitch control assembly; the pitch control assembly is mechanically coupled to the rotor arm; and the rotor arm is mechanically coupled to the vertical axis;
   in this manner, the wind current can accelerate the air foil blade around the vertical axis, turning the vertical axis and creating mechanical energy;
   the pitch control assembly comprises a pitch control assembly housing operably coupled to a first stop bar, a second stop bar and a cushion mass; the pitch control assembly housing is operably coupled to a pitch control assembly bottom plate;
   a heavier mass and a lighter mass rest upon a blade control plate; a blade control plate stem is operably coupled to the vertical axis which is used in the vertical axis wind turbine;
   in this manner, the heavier mass and the lighter mass allow the air foil blade to rotate in either direction which converts wind energy into rotational energy that accelerates the air foil blade and increases rotation of the rotor arm until linear velocity of the air foil blade exceeds a given velocity where the heavier mass pushes against a first blade control pusher bar and the lighter mass pushes against a second blade control pusher bar locking the air foil blade in a position tangent to the rotor arm.

5. The vertical axis wind turbine of claim 4,
   where the pitch control assembly bottom plate is mechanically coupled to a dampening spring;
   the dampening spring is mechanically coupled to the blade control plate, where the blade control plate is mechanically coupled to the first blade control pusher bar, the second blade control pusher bar and the blade control plate stem.

6. The vertical axis wind turbine of claim 5, wherein
   the blade control plate is further mechanically coupled to a third blade control pusher bar and a fourth blade control pusher bar; where the first blade control pusher bar, the second blade control pusher bar, the third blade control pusher bar, and the fourth blade control pusher bar have rounded ends to allow greater control of the heavier mass and the lighter mass.

\* \* \* \* \*